United States Patent Office 3,681,112
Patented Aug. 1, 1972

3,681,112
THERMOGRAPHIC STENCIL SHEET
Fred Pollak, Bronx, N.Y., assignor to Polychrome Corporation, Yonkers, N.Y.
No Drawing. Continuation-in-part of application Ser. No. 43,950, June 5, 1970. This application Oct. 6, 1970, Ser. No. 78,623
Int. Cl. B44d 3/30
U.S. Cl. 117—35.5                 4 Claims

ABSTRACT OF THE DISCLOSURE

A thermographic stencil sheet which comprises an ink-pervious base sheet, and an ink-impervious coating thereon of a heat-flowable composition of a resinous thermoplastic ink-impervious film-forming material, a plasticizing material partially but incompletely compatible with said film-forming material, and a small amount of a polyethylene glycol having a molecular weight of about 3000 to about 5000, said composition being soluble in a volatile solvent and forming a substantially clear homogeneous continuous imperforate coating when deposited from a solution thereon, and said coating being provided on said base sheet by deposition of said composition on the base sheet from a solvent solution thereof.

---

This application is a continuation-in-part application of my copending application Ser. No. 43,950 filed June 5, 1970, now abandoned.

This invention relates to improved thermographic stencils, and more particularly to the addition of agents to the heat-sensitive coating compositions of thermographic stencils that reduce the somewhat tacky character and increase the dryness of the coating, substantially improve the printing character of the stencil by reducing pinholes and other imperfections in the printing areas and by enhancing the clartiy and sharpness of the printing areas, and give increased shelf-life.

Thermographic stencils that can be imaged by infrared generated heat absorption are known, for example, as disclosed in U.S. Pat. No. 2,808,777. One such type of stencil is disclosed in U.S. patent application Ser. No. 674,153 filed Oct. 10, 1967, now abandoned. The stencil has an ink-pervious base sheet and an ink-impervious coating thereon of a heat-flowable composition of resinous thermoplastic ink-impervious film-forming material and a plasticizing agent partially but incompletely compatible with the film-forming material. Upon exposure to infrared radiation through an original sheet to be reproduced, the coating composition in the image area is rendered flowable and the composition is absorbed into a contact absorbent sheet and removed from the stencil base sheet, which can then be used to print reproductions of the original.

The heat-flowable, thermoplastic, ink-impervious coating materials utilized in the above-described thermographic stencils include thermoplastic cellulose esters and ethers, addition polymers and copolymers, particularly vinyl polymers, and mixtures thereof. Cellulose acetate butyrate, cellulose acetate propionate, ethyl cellulose and vinyl chloride-vinyl acetate copolymers are preferred. Nitrocellulose, conventionally used in typing stencils, is not thermoplastic and thus is not contemplated for use herein in any substantial proportion. The proportion of the film-forming material can be in the range of about 5% to about 50% by weight of the coating composition, its amount being roughly inversely proportional to the film-forming strength of the thermoplastic resinous material. Suitable partially but incompletely compatible plasticizers for the ink-impervious thermoplastic materials in general include oily substances such as mineral oils, particularly petroleum oils, having viscosities below about 10,000 S.S.U. at 100° F. and preferably above about 30 S.S.U. at 100° F., vegetable oils such as castor oil, and animal oil derivatives such as oleyl alcohol. Other oily plasticizers, especially for the cellulose acetate butyrate, are polyisobutylene of about 400 to about 1500 molecular weight, sorbitan mono-oleate, chloronaphthalenes and pentaerythritol tetrastearate. Additional suitable plasticizers are modified rosins and fatty acid esters, such as methyl-esterified rosin, hydrogenated methyl esters of rosin, glycerol-esterified rosin and pentaerythritol esters of saturated fatty acids. The mineral oils should have aniline points in the range of about 50° F. (mixed) to about 130° F. (straight) for oils that are primarily naphthenic or paraffinic to about 160° F. (straight) for oils that are primarily aromatic. It is possible, of course, to use combinations of conventional plasticizers for the film-forming materials that individually are either compatible or incompatible therewith, provided that the combination of such plasticizers has the requisite partial but incomplete compatibility and, preferably, that they are mutually compatible in a single phase at room temperature.

I have found that in thermographic stencils of the kind previously described herein the tackiness of the ink-impervious coatings thereon can be reduced, the image sharpness and dryness can be enhanced, and pinholes in the coating can be reduced or eliminated, by including in the heat-flowable coating composition a small amount of polyethylene glycol of rather particular molecular weight, and that the sensitivity to imaging of such stencils not only is unimpaired but is improved. The polyethylene glycol should have a molecular weight in the order of about 3000 to about 5000, preferably about 4000. A commercially available polyethylene glycol eminently suitable for use according to this invention is Carbowax 4000 sold by Union Carbide Corporation. The polyethylene glycol is used in the heat-flowable coating composition in an amount of about 0.05% to about 1.0% by weight of the ink-impervious thermoplastic material and the partially but incompletely compatible plasticizer in the coating composition, desirably in an amount of about 0.1% to about 0.5%, and preferably about 0.25%.

EXAMPLE 1

Thermographic stencils were prepared by coating a heat-flowable coating composition onto stencil base sheets of abaca fiber at a coating weight of about 3.7 gms. per 8½ by 16½ inch sheet. The composition used to coat the base sheets was formulated with 45 lbs. of cellulose acetate butyrate (Eastman Chemical Products) having an average butyral content of 48% and an average acetyl content of about 6% as the ink-impervious film-forming thermoplastic resin, and 219 lbs. of partially but incompletely compatible plasticizers, namely, 99 lbs. of Mobilsol L petroleum oil (Mobil Oil Corporation), a refined naphthenic petroleum oil having a viscosity of 61 S.S.U. at 100° F., an aniline point of 162° F., an API gravity of 25.7° and a distillation range of 490° to 708° F. (90%), and 120 lbs. of Hercolyn D (Hercules, Inc.) hydrogenated methyl ester of rosin along with 245 lbs. of toluene, 175 lbs. of ethyl acetate, 34.8 lbs. of ethyl alcohol and 0.6 lb. of dilauryl-thiodipropionate antioxidant. To different samples of that coating composition, which amounted to about 100 gals., about 5.4 gms. was added per gallon of Carbowax polyethylene glycols having molecular weights of about 1000, 1500, 4000, 6000 and 20,000, which amounted to about 0.23% by weight of the thermoplastic resin and plasticizers. Of the stencils thus prepared, the ones coated with the composition containing the 4000 molecular weight polyethylene glycol significantly reduced pinholes and increased image sharpness while at the same time reducing tackiness and improving sensitivity.

EXAMPLE 2

Thermographic stencils were prepared as described in Example 1 by coating with a composition containing 45.2 lbs. of cellulose acetate butyrate as the ink-impervious film-forming thermoplastic material and 198.7 lbs. of partially but incompletely compatible plasticizer, i.e., 94.2 lbs. of Mobilsol L, 56.4 lbs. of Hercolube A pentaerythritol ester of saturated fatty acid (Hercules, Inc.) and 48.1 lbs. of Staybellite Ester 5 glycerol ester of hydrogenated rosin (Hercules, Inc.), together with 255 lbs. of toluene, 182 lbs. of ethyl acetate, 73. lbs. of ethyl alcohol, 9.75 lbs. of Syloid 255 silicate drying and thickening agent (Dow Chemical), and 0.45 lb. of dilauryl-thiodipropionate antioxidant. To different samples of that composition, which amounted to about 100 gals., was added about 5.4 gms. per gallon of Carbowax polyethylene glycols having molecular weights of about 1000, 1500, 4000, 6000 and 20,000, which amounted to about 0.25% by weight of the thermoplastic resin and plasticizers. Results were obtained corresponding to those described in Example 1.

I claim:

1. A thermographic stencil sheet which comprises an ink-pervious base sheet, and an ink-impervious coating thereon of a heat-flowable composition of a resinous, thermoplastic, ink-impervious film-forming material selected from the group consisting of cellulose acetate butyrate, cellulose acetate propionate, ethyl cellulose, polystyrene and vinylchloride-vinyl acetate copolymer, a plasticizing material partially but incompletely compatible with said film-forming material, and from 0.05% to 1.0% by weight of said composition of a polyethylene glycol having a molecular weight of about 3000 to about 5000, said composition being soluble in a volatile solvent and forming a substantially clear homogeneous continuous imperforate coating when deposited from a solution thereon, and said coating being provided on said base sheet by deposition of said composition on the base sheet from a solvent solution thereof.

2. A thermographic stencil sheet according to claim 1 wherein said polyethylene glycol is used in an amount of about 0.1% to about 0.5% by weight of said composition.

3. A thermographic stencil sheet according to claim 1 wherein said polyethylene glycol has a molecular weight of about 4000.

4. A thermographic stencil sheet according to claim 1 wherein said plasticizer is a mineral oil having a viscosity between about 30 and 10,000 S.S.U. at 100° F. and an aniline point of about 50° F. (mixed) to about 160° F. (straight), a vegetable oil, an animal oil, a polyisobutylene having a molecular weight of about 400 to about 1500, sorbitan mono-oleate, chloronaphthalene, pentaerythritol tetrastearate, a modified ester of rosin or an esterified fatty acid.

References Cited

UNITED STATES PATENTS

| | | | |
|---|---|---|---|
| 548,116 | 10/1895 | Zuccato | 117—35.5 |
| 1,244,189 | 10/1917 | Fuller | 117—35.5 |
| 1,792,095 | 2/1931 | Horii | 117—35.5 |
| 2,808,777 | 10/1957 | Roshkind | 117—158 |
| 3,062,675 | 11/1962 | Shelffo | 117—35.5 |

MURRAY KATZ, Primary Examiner

U.S. Cl. X.R.

117—155 UA, 157; 100—204; 260—41 C